United States Patent Office 2,767,478
Patented Oct. 23, 1956

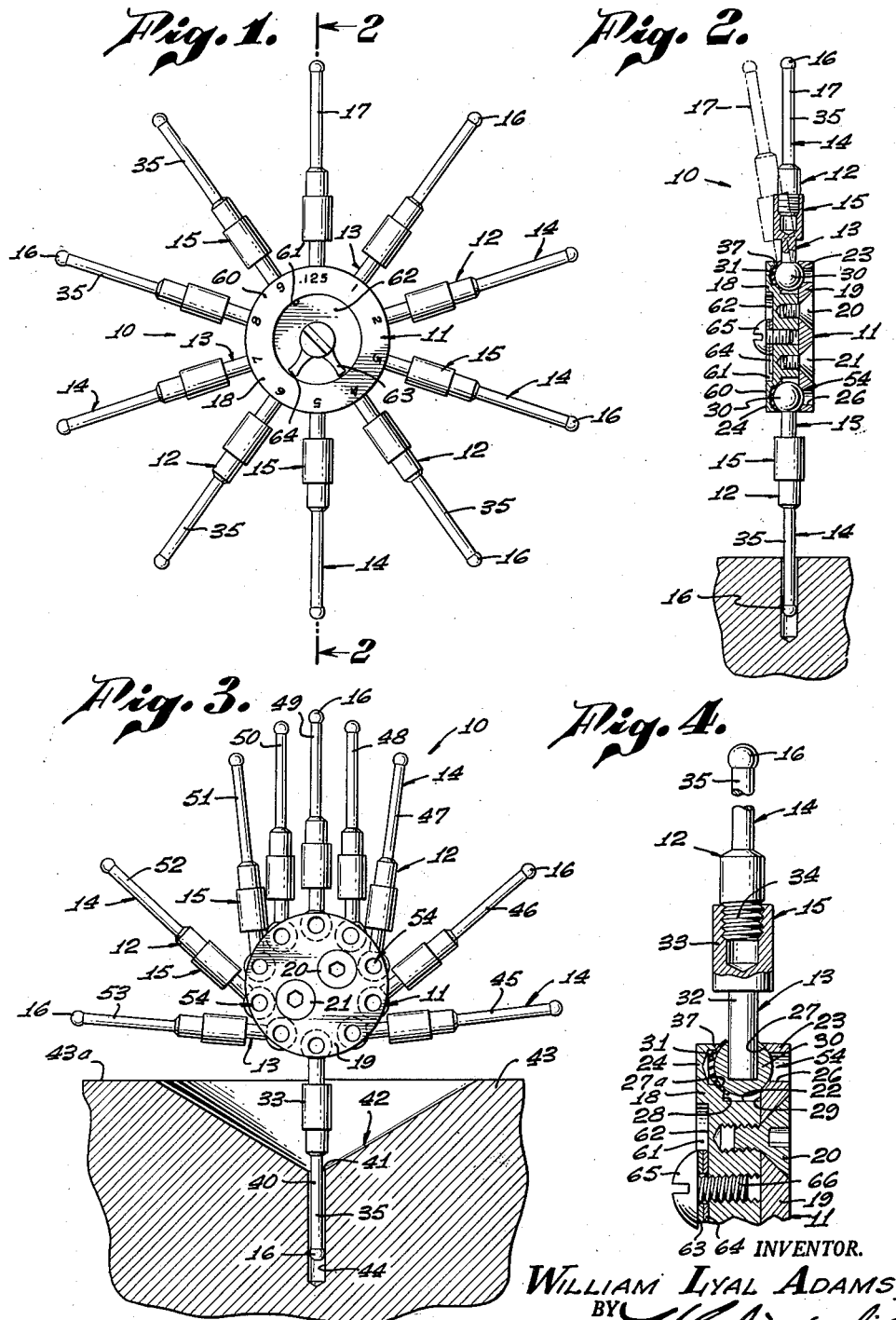

2,767,478

BALL TIP GAUGE ASSEMBLY

William Lyal Adams, Bell, Calif., assignor to Industrial Tectonics, Inc., Los Angeles, Calif., a corporation of Michigan Application May 3, 1954, Serial No. 427,280

8 Claims. (Cl. 33—178)

This invention relates to improvements in gauges of the type used for measuring hole diameters, as for example the internal diameters of bored holes.

The usual way to measure internal diameters of holes is by the trial and error method, using what are known in practice as "go" and "no-go" gauges. This practice amounts to the selection from a group of cylindrical gauges a particular gauge having an estimated diametral dimension equal to that of the hole, and determining whether or not the selected gauge exactly fits the hole. One disadvantage heretofore encountered in such work has resulted from the excess amount of time consumed in selecting a particular gauge that will just fit the hole to give the required measurement. The selection of the correct gauge is arrived at by a process of elimination in which much time is wasted in selecting gauges of various sizes, picking them up, and laying them down when they are found to be too large or too small. Even those who are practiced in the use of and the handling of measuring instruments encounter considerable difficulty in selecting the correct gauge when hole measurements must be obtained to the nearest one ten-thousandth of an inch.

In view of these difficulties, it is a major object of the invention to provide an improved gauge for measuring hole diameters which may be held in the hand, and which is so constructed and arranged as to permit rapid successive use of a plurality of gauging elements. The gauging elements preferably comprise fingers having ball tips of a known diameter and arranged in successive order of size to permit rapid use of the gauging elements to arrive at the correct hole diameter in a minimum amount of time. Furthermore, the gauging elements preferably have swivel connections with a gauge mounting body to permit all but one of the gauges to be pivoted out of proximity to the temporarily selected measuring gauge, thereby allowing that particular gauge to be inserted in a hole drilled in a flat member without interference between the other gauge elements and the flat member.

In order to facilitate repeated use of only a few successive gauge elements, a pair of indicators are provided on the gauge mounting member, the indicators being swingably mounted to define an adjustable included angle visually indicating which particular group of gauge elements is to be used.

A threaded coupling is provided to join the ball tip carrying end of each gauge finger with the swiveled end of each finger, to permit quick removal of any of the ball tip carrying ends of the fingers and replacement thereof.

One form of gauge may have ten fingers projecting generally radially outwardly from the mounting member, each gauge finger having a ball-tip diameter one ten-thousandth of an inch larger than one adjacent ball-tip diameter. Thus a succession of ten measuring elements graduated in ten-thousandths part of an inch are provided in one gauge, and one gauge may be used instead of ten individual gauges.

The above and other features and objects of the invention will be understood more fully from the following detailed description of the drawing, in which:

Fig. 1 is a plan view of a gauge embodying the invention;

Fig. 2 is a section taken on line 2—2 of Fig. 1;

Fig. 3 is a plan view of the gauge indicating its use; and

Fig. 4 is an enlarged section of the upper portion of Fig. 2.

Referring now to Fig. 1 of the drawings, there is illustrated a gauge 10 including a disc-shaped mounting member 11 having ten fingers 12 projecting generally radially outwardly from the mounting member. Each of the fingers includes a swiveled connecting portion 13, a ball-tip carrying portion 14 extending outwardly from the connecting portion 13, and a coupling device 15 intermediate portions 13 and 14. A ball-tip 16 is formed on the outward end of each of the fingers 12. Each of the ball tips has a diameter which is different than each of the other ball tips, and it will be understood that beginning with the upwardly extending vertical finger 17 and proceeding clockwise around the gauge, the diameters of the ball tips decrease incrementally. For example, the ball tip at the end of finger 17 may have a basic diameter of .125 inch as indicated on the body portion of the gauge, and thereafter proceeding clockwise around the gauge successive ball tips decrease in diameter by one ten-thousandths of an inch, as labeled on the body of the gauge. The result of this construction is that the one gauge 10 may be used to obtain the measurement to one ten-thousandths of an inch of holes the diameter of which lie between .1250 inch and .1241 inch.

The disc-shaped mounting member 11 may comprise a pair of discs 18 and 19 which are held together by screws 20 and 21, as shown in Figs. 2 and 4. Disc 18 has formed thereon an annular slot 22. The disc 19 includes an annular portion 23 which overhangs slot 22 and defines along with a similar overhanging portion 24 on disc 18, the wall portions of annular groove 22 lying between the two overhanging portions 23 and 24. A series of cylindrical holes are drilled through the overhanging portions 23 and 24 substantially perpendicular to the planes of the discs 18 and 19. The holes are spaced circumferentially around the mounting member 11 and inwardly from the periphery thereof. Each of the holes 26 extends completely through overhanging portion 23 of disc 19 but only part way through overhanging portion 24 of disc 18. The intersection of each of the drilled holes 26 with the annular groove or slot 22 is beveled on both sides 28 and 29 of the groove 22 to form conically tapered walls 27 and 27a defining a chamber or socket, conforming substantially to the shape of the ball 30 positioned in the socket. A pliable friction member 31, such as a piece of neoprene, is positioned between the ball and the tapered or beveled wall 27a.

Rigidly mounted in the ball 30 and projecting outwardly from the edge of the mounting member 11 is the connection means 13 which comprises a short shaft 32 having an internally threaded coupling member 33 formed on the outer end thereof. The coupling member 33 on the swivel end of each finger provides a means for replaceably connecting the threaded gauge portion of any finger with any swivel portion 32. Thus, it will be seen that should any ball tip become damaged in use, the gauging portion of the finger associated with that particular ball tip may be quickly removed from the threaded coupling member 33 and a new gauge portion quickly attached. In other words the mounting member 11 need not be disassembled in order to replace the gauging portion of any finger.

The ball tip carrying portion 14 of the finger 12 extends outwardly from the member 33 and includes a threaded shank portion 34 adapted to threadedly engage member 33. The ball tip 16 is carried on the outer end of shank 35, which extends outwardly from threaded shank portion 34.

It will be understood that disc 19 may be adjustably urged toward disc 18 by screws 20 and 21 so that the ball 30 and friction material 31 may be gripped between the tapered socket walls 27 and 27a. The finger 13 may then be pivoted or swiveled against the frictional resistance provided by the friction material 31, so that the finger may be rotated into any desired position and will remain in that position after such pivoting. As shown in Fig. 2, the finger may be pivoted transversely out of the plane of the disc-shaped member 11, until the edge of the shank 32 engages the outer edge 37 of overhanging portion 24 of disc 18. Likewise, the finger 12 may be pivoted in the opposite direction until the shank 32 engages the overhanging portion 23 of disc 19.

The use of the gauge is illustrated in Fig. 3. The ball tip 16 of finger 40 is moved vertically downwardly past the apex 41 of a dished portion 42 of a flat member 43 and into a bored hole 44 extending downwardly beyond apex 41. The remaining fingers 45 through 53 of the gauge are shown in various positions, all of which are such as to lie at least 90 degrees upwardly from the vertical and downward position of finger 40. In other words, all of the fingers 45 through 53 extend conveniently upwardly from the horizontal plane formed by the flat surface 43a of the body 43 in order to facilitate the downward extension of shank 35 into hole 44 with the coupling portion or member 33 extending downwardly into the dished portion 42 of body 43. In this connection it will be understood that each of the ball and socket joints or connections 54 by means of which each of the fingers is joined to the mounting member 11 is circumferentially spaced from an adjacent ball and socket connection a sufficient distance to allow the required pivoting of each finger without interference with other fingers or the edge of the mounting member 11.

As shown in Figs. 1, 2 and 4, the face 60 of member 11 has centrally formed therein a shallow cylindrical depression 61 having an inner wall 62. A pair of radial indicators 63 and 64 are held in position in depression 61 by the head 65 of a screw 66, the shank of which threadedly engages disc 18 at the center thereof. The screw 66 is tightened sufficiently to engage the indicators 63 and 64 frictionally but not so tightly so as to preclude rotation thereof by hand. It will be understood that the indicators 63 and 64 may be set like the hands of a clock to indicate generally an included angle which will conveniently show which fingers are included within the angle. Thus any number of the gauging fingers which it is desired to use in a gauging operation may be conveniently indicated. In other words should it be desired in a gauging operation to use only three fingers, the indicators 63 and 64 may be set as shown in Fig. 1 so that the three fingers indicated may be readily referred to.

I claim:

1. A gauge for measuring hole diameters comprising a body having an outer edge, a plurality of fingers spaced at intervals around said body and projecting outwardly from said edge, each of said fingers having a ball tip gauge at the outer end thereof for measurement of a hole diameter, and means pivotally connecting the fingers to said body.

2. The invention as set forth in claim 1, wherein said ball tips are successively graduated in a decreasing size order for facilitating quick measurement of a hole diameter.

3. The invention as set forth in claim 1, wherein each of said fingers comprises a first section pivotally connected to said body, a gauge section projecting outwardly beyond said first section, and a threaded coupling interposed between and connecting said sections to facilitate replacement of the gauge section of any finger.

4. A gauge for measuring hole diameters comprising a disc-shaped body having an outer edge, a plurality of swivel members pivotally connected to said body adjacent the curved edge of said body and spaced at intervals around said edge, and a plurality of fingers projecting from said swivel members, each of said fingers carrying a ball tip gauge at the outer end thereof for measuring a hole diameter.

5. The invention as set forth in claim 4, wherein each of said swivel members comprises a ball carried in a socket formed in said body to allow lateral pivoting of remaining fingers away from one selected finger.

6. The invention as set forth in claim 5, including a friction element compressed between said ball and a wall of said socket for precluding free swinging movement of said finger.

7. A gauge for measuring hole diameters comprising a disc-shaped body having an inwardly extending peripheral groove and a plurality of spaced cylindrical holes intersecting said groove near the edge of said body to define a plurality of ball sockets, and a plurality of hole gauging fingers projecting outwardly from said body, each of said fingers being rigidly joined to a ball carried in one of said sockets to permit pivoting of said fingers out of proximity to any one selected gauging finger.

8. The invention as set forth in claim 7, wherein said ball sockets are spaced apart sufficiently to allow at least 90 degree pivoting of remaining fingers away from one selected finger.

References Cited in the file of this patent

UNITED STATES PATENTS

| 574,043 | Reichardt | Dec. 29, 1896 |
| 950,221 | Bernhardt | Feb. 22, 1910 |
| 1,157,389 | Hess | Oct. 19, 1915 |

FOREIGN PATENTS

| 359,596 | Germany | Sept. 25, 1922 |